(12) United States Patent
Mair et al.

(10) Patent No.: US 12,229,530 B2
(45) Date of Patent: Feb. 18, 2025

(54) METHOD FOR GENERATING PROGRAM CODE, METHOD FOR CONFIGURING A CONTROL UNIT AND COMPUTER SYSTEM

(71) Applicant: dSPACE GmbH, Paderborn (DE)

(72) Inventors: Michael Mair, Paderborn (DE); Lars Wallbaum, Paderborn (DE)

(73) Assignee: DSPACE GMBH, Paderborn (DE)

( * ) Notice: Subject to any disclaimer, the term of this patent is extended or adjusted under 35 U.S.C. 154(b) by 90 days.

(21) Appl. No.: 18/048,452

(22) Filed: Oct. 21, 2022

(65) Prior Publication Data

US 2023/0176821 A1 Jun. 8, 2023

(30) Foreign Application Priority Data

Oct. 28, 2021 (DE) .......................... 102021128101.6

(51) Int. Cl.
*G06F 9/44* (2018.01)
*G06F 8/30* (2018.01)

(52) U.S. Cl.
CPC ...................................... *G06F 8/30* (2013.01)

(58) Field of Classification Search
None
See application file for complete search history.

(56) References Cited

U.S. PATENT DOCUMENTS

| | | | | |
|---|---|---|---|---|
| 8,839,187 B1 * | 9/2014 | Yan | ........................ | G06F 8/423 717/106 |
| 9,678,628 B2 * | 6/2017 | Gohr | ........................ | G06F 8/34 |
| 10,402,731 B1 * | 9/2019 | Cosic | ....................... | G06F 9/451 |
| 2015/0089468 A1 * | 3/2015 | Poxon | ....................... | G06F 8/30 717/106 |

(Continued)

FOREIGN PATENT DOCUMENTS

DE 102020124080 A1 3/2021

OTHER PUBLICATIONS

Whitsitt Sean et al: "Model Based Development with the Skeleton Design Method", 2013 20th IEEE International Conference and Workshops on Engineering of Computer Based Systems (ECBS), IEEE, Apr. 22, 2013 (Apr. 22, 2013), pp. 12-19, Tucson, Arizona, USA, XP032485525, DOI: 10.1109/ECBS.2013.16 [retrieved on Sep. 16, 2013].

(Continued)

*Primary Examiner* — Qamrun Nahar
(74) *Attorney, Agent, or Firm* — LEYDIG, VOIT & MAYER, LTD.

(57) ABSTRACT

A computer-implemented method generates program code of an executable control program for controlling a control system. Functionality of the control program is described at least in part in a graphical model. The graphical model is translated into program code in a text-based programming language. The method includes: generating a first placeholder representing a variable, the first placeholder being used in a predetermined segment of the program code; generating a second placeholder, which is placed before a beginning of the predetermined segment of the program code that uses the first placeholder; and generating a third placeholder, which is placed after an end of the predetermined segment of the program code that uses the first placeholder.

14 Claims, 3 Drawing Sheets

(56) References Cited

U.S. PATENT DOCUMENTS

2015/0193209 A1* 7/2015 Carter ................. G06F 8/30
                                                    717/109
2019/0205101 A1* 7/2019 Shin .................... G06F 8/41
2021/0255842 A1* 8/2021 Levitt ................. G06F 8/34

OTHER PUBLICATIONS

Wikipedia: "Make (software)", Oct. 24, 2021 (Oct. 24, 2021), pp. 1-14, XP093156071, found in Internet: URL: https://en.wikipedia.org/w/index.php?title=Make_(software)&oldid=1051675981.

* cited by examiner

METHOD FOR GENERATING PROGRAM CODE, METHOD FOR CONFIGURING A CONTROL UNIT AND COMPUTER SYSTEM

CROSS-REFERENCE TO PRIOR APPLICATIONS

This application claims benefit to German Patent Application No. DE 102021128101.6, filed on Oct. 28, 2021.

FIELD

The present invention relates to a computer-implemented method for generating program code of an executable control program for controlling a control system.

The invention additionally relates to a method for configuring a control unit. Furthermore, the present invention relates to a computer program, to a computer-readable data medium, and to a computer system.

BACKGROUND

Control units are used in many different applications in order to record physical variables of a process and/or influence a process using connected actuators. For example, it may be an anti-lock control in a braking operation.

The time constants determining the dynamic behavior of the process often require cycle times of 1 ms or less, so the control unit must have real-time capabilities.

To design control units more quickly, control strategies are often developed on the basis of models in a computing environment such as MATLAB/Simulink. Therefore, the process and/or the controller, or the behavior of the control unit in general, can be simulated first and it can be checked whether desired properties are present.

In particular, the models may be block diagrams comprising blocks that execute operations such as calculations; by way of example, a block may calculate one output signal from a plurality of input signals. In general, block diagrams are executed cyclically, with all blocks being permanently retained in the memory and each block being executed once per time step.

In particular, in each time step a block may apply one or more operations to input signals from the parent block in order to generate output signals for the current step. In addition to a cyclically configured sub-model for describing approximately continuous behavior, block diagrams may additionally comprise a sub-model for describing a discrete behavior in which a number of states and transition conditions are defined.

Program code for programming the control unit can be generated directly from the models using a program code generator. A program code generator for generating program code in production quality is known, for example, from the document "Production Quality Code Generation from Simulink Block Diagrams," Proceedings of the 1999 International Symposium on Computer Aided Control System Design, Kohala Coast, Hawaii, H. Hanselmann et al.

In this case, the generated program code may be adapted by additionally annotating the blocks or block variables. In particular, a model that was originally generated for calculating high-precision floating-point number variables may be provided with scales, as a result of which the control unit can use fixed-point numbers in its computations in order to significantly reduce the computational effort while incurring only slight drops in precision.

Many years ago, the AUTOSAR development partnership defined a software framework for developing control unit software.

Before the actual control strategy or desired behavior is implemented, an architecture of the software is established. For example, the software architecture can correspond to the AUTOSAR Classic Platform Standard Version 4.3.0 dated Nov. 30, 2016. The architecture comprises software components, sub-components such as runnables, and interfaces of software components.

Messaging between different software components is accomplished using the virtual function bus of a runtime environment that is generated in a suitable way for the specific control unit on the basis of the defined architecture.

For relatively large development projects, different parts of the development are often undertaken by several different people, who may even be working in different companies. For instance, numerous function developers may generate and enhance separate parts of the model. A sub-model generated once may also be used for different projects and adapted in terms of its functionality.

In this case, it is expedient if program code is generated incrementally, i.e., program code is generated separately for individual sub-systems and then merged to form the program code for the overall model. The model is thus split into a plurality of sub-models, providing the advantage whereby, if a local change is made, only the code for the corresponding sub-models needs to be generated again.

Incremental program code generation should be construed to mean that a check is carried out as to whether the sub-model in question for a program code generator has been changed since the last generation of program code. For this purpose, a checksum regarding the blocks of the program code generator and/or a model version counter that has been increased with each change may be stored in a definition data pool, for example.

Alternatively or additionally, a checksum regarding the most recently generated code and/or a code version counter that has been increased with each code generation for said code generation unit may be stored in the definition data pool. If, in particular, a newly calculated checksum regarding the blocks of the program code generator differs from the stored checksum for the model, program code then has to be generated again because changes have been made to the model since the last generation of program code. Otherwise, i.e., if the program code is up to date, it can be used.

The program code generator thus generates program code in a text-based programming language, e.g., C code, directly from a graphical model, e.g., MathWorks, SimuLink, and/or Stateflow. As a result, a program code that has been generated once for library sub-systems or referenced models can be used in different projects without having to generate and test the program code again for those projects.

DE 102020124080 A1 describes a method for generating source code from one or more blocks of a block diagram, the block diagram being hierarchical and comprising at least a first sub-system that is configured for incremental code generation, the first sub-system being encompassed by a second sub-system, the block diagram referencing a definition database which comprises a first object, the method comprising the steps of opening the block diagram comprising the first sub-system in a model editor; generating source code for the first sub-system, wherein generating source code comprises determining information about the first sub-system; storing information about the first sub-system in the first object; and generating source code for the block diagram, wherein the first object is read out to influence at least one code generation parameter.

Information about whether a variable is for read-only access may be stored in the definition data pool or database, for example. This allows the code generation in an external sub-system to be optimized without the need for code to be generated again for an internal sub-model. The data exchange between the external and internal sub-systems may, for example, be accomplished using input and output ports. If the internal sub-model models a function, the calling side in the graphical model is in this case an external system (or sub-system), and the called-up side, i.e., the internal sub-model, receives data via a port and outputs data via a further port, for example. In this case, in the internal sub-system a placeholder may be defined for which a global variable is applied during the code generation in the calling system. This allows for a certain level of flexibility in the communication, but this is not suitable, for example, for assisting all the usual AUTOSAR communication modes.

SUMMARY

In an exemplary embodiment, the present invention provides a computer-implemented method for generating program code of an executable control program for controlling a control system. Functionality of the control program is described at least in part in a graphical model. The graphical model is translated into program code in a text-based programming language. The method includes: generating a first placeholder representing a variable, the first placeholder being used in a predetermined segment of the program code; generating a second placeholder, which is placed before a beginning of the predetermined segment of the program code that uses the first placeholder; and generating a third placeholder, which is placed after an end of the predetermined segment of the program code that uses the first placeholder.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

Unless indicated otherwise, like reference signs designate like elements in the drawings.

DETAILED DESCRIPTION

Exemplary embodiments of the present invention better assist various communication modes without any program code being generated again.

In an exemplary embodiment, the present invention provides a computer-implemented method for generating program code of an executable control program for controlling a control system.

In further exemplary embodiments, the present invention provides a method for configuring a control unit, a computer program, a computer-readable data medium, and a computer system.

The invention relates to a computer-implemented method for generating program code of an executable control program for controlling a control system, wherein the functionality of the control program is described at least in part in a graphical model, wherein the graphical model is translated into program code in a text-based programming language.

The method comprises generating a first placeholder representing a variable, said first placeholder being used in a predetermined segment of the program code.

The method additionally comprises generating a second placeholder, which is placed before a beginning of said predetermined segment of the program code that uses the first placeholder.

Furthermore, the method comprises generating a third placeholder, which is placed after an end of said predetermined segment of the program code that uses the first placeholder.

The invention further relates to a method for configuring a control unit, wherein the control unit comprises at least one arithmetic logic unit and preferably at least one sensor and/or at least one actuator in order to record data on a physical process and/or influence said process.

The method comprises inputting a block diagram and generating a program code using the method according to the invention.

Additionally, the method comprises compiling the program code for the arithmetic logic unit so that an executable program code is generated, transmitting the executable program code to the control unit, and storing the executable code on a non-volatile memory of the control unit and/or executing the executable code by the arithmetic logic unit of the control unit.

The invention additionally relates to a computer program comprising program code for carrying out at least one of the methods according to the invention when the computer program is executed on a computer.

The invention further relates to a computer-readable data medium comprising program code of a computer program for carrying out at least one of the methods according to the invention when the computer program is executed on a computer.

Furthermore, the invention relates to a computer system comprising a human-machine interface, a non-volatile memory, and a processor, wherein the processor is configured to carry out the method according to the invention.

One concept of the present invention is to generate a more flexible code by providing the first, second, and third placeholders as early as in the incremental code generation for a particular function. As a result, ready-generated program code for particular intended purposes can be adapted accordingly by using the placeholders.

To obtain the required flexibility, said three placeholders are used instead of a single placeholder, as is conventionally used.

The conventionally used single placeholder is used in the program code like a variable, i.e., like a global variable, so it can only be replaced by something that behaves like a variable in the program code.

The placeholders according to the invention are generated in the program code during the incremental program code generation, although the definition of the placeholders is not generated until a later time. When the surrounding system is then generated at that later time, the definition of the placeholders can be generated as required.

The advantage of this approach is that the position at which a variable represented by the placeholders is read and written can be marked and defined by providing the placeholders.

In this case, the second placeholder is set in the program code before the first use of the first placeholder, and the third placeholder is set in the program code after the last use of the first placeholder.

Therefore, different phases of a data object represented by the placeholder can be distinguished by inserting the placeholders, as a result of which the program code suitable for each phase can be used. Where the program is run serially, the second placeholder representing the reading of the data object is run first, followed by the first placeholder representing the data object, and lastly the third placeholder representing the writing of the data object.

Since the first placeholder is used like a variable, it cannot be defined in relation to an access function that cannot be used like a variable in the program code.

Since the second and third placeholders are not used like a variable in the program code, they can be defined in relation to such access functions. Therefore, by positioning them relative to the first placeholder, it is possible to place said access functions in the program code either before or after the use of the first placeholder.

Alternatively, at least one of the placeholders can be defined as empty, for example; in other words, in this case it is replaced by nothing or by a space. The code can thus be kept compact if one of the phases is not needed.

Under AUTOSAR, for example, it is expedient to distinguish between the reading of the second placeholder representing the data object and the writing of the third placeholder representing the data object, for the purpose of accessing interrunnable variables. An interrunnable variable in AUTOSAR is a modeling element for specifying communication between the runnable entities in a software component.

Interrunnable variables can be implicit or explicit. Implicit means that a runnable entity operates on a local copy of an interrunnable variable. The local copy is generated by the runtime environment when execution of the runnable entity begins. Changes are written back when the runnable entity is terminated. This prevents concurrent access to interrunnable variables during the execution of the runnable entity. Explicit means that the runnable entity can directly access an interrunnable variable. Changes are immediately visible for other runnable entities with access to the interrunnable variable in question.

Distinguishing between the reading of the second placeholder representing the data object and the writing of the third placeholder representing the data object is also beneficial in AUTOSAR communication via ports.

Implicit AUTOSAR communication can be used like a variable but must draw a distinction between reading and writing accesses. Therefore, this cannot be used for the first placeholder when said first placeholder is used in a general way.

Explicit AUTOSAR communication cannot be used like a variable and must distinguish between reading and writing access.

These two problems can now be solved by resolving the second placeholder in a reading access and/or by resolving the third placeholder in a writing access using a local buffer, and by resolving the first placeholder in a direct access to the local buffer.

Further embodiments of the present invention are set out in the description below, with reference to the drawings.

According to an exemplary embodiment of the invention, the first placeholder, the second placeholder, and the third placeholder are generated in a program code that belongs to a sub-system of the, in particular surrounding, graphical model. Advantageously, a variable represented by the first placeholder can thus be generated at a predetermined position of the program code associated with the graphical model.

According to another exemplary embodiment of the invention, the method comprises generating a fourth placeholder, which is placed at a beginning of a usage region of said predetermined segment of the program code for defining the variable represented by the first placeholder. By providing the fourth placeholder, which is a setup placeholder, an auxiliary variable that buffers the value of the data object or variable can thus advantageously be used.

According to another exemplary embodiment of the invention, a calculation is performed in said predetermined segment of the program code by using the first placeholder, which represents a variable. By replacing the first placeholder with a variable, a calculation and/or operation performed in the code can thus be influenced accordingly.

According to another exemplary embodiment of the invention, the second placeholder is placed immediately before the beginning of said predetermined segment of the program code that uses the first placeholder, in particular at the beginning of a usage region of the first placeholder. As a result, a current value for the variable represented by the first placeholder can advantageously be determined immediately before it is used.

Using the second placeholder, for example, a local variable can be defined, which is then accessed via the first placeholder. Alternatively, it is also possible that a global variable is accessed via the first placeholder and no local variable is defined.

According to a concept of the invention, accesses to external data objects in the generated program code can be adapted at will to a greater or lesser extent by replacing the placeholders accordingly, without having to generate the generated program code again.

According to another exemplary embodiment of the invention, the third placeholder is placed immediately after the end of said predetermined segment of the program code that uses the first placeholder, in particular at the end of the usage region of the first placeholder. As a result, by replacing the third placeholder with a writing access, a newly calculated value can be written directly after a usage region of the first placeholder. Potential side effects owing to a delay between calculation and writing-back are prevented.

According to another exemplary embodiment of the invention, at least one placeholder, in particular the first placeholder, the second placeholder, the third placeholder, and/or the fourth placeholder, is generated as a preprocessor macro in the program code.

According to another exemplary embodiment of the invention, the placeholders are used in the sub-system and defined in the graphical model. The graphical model thus makes it possible to define the variables used as part of the incremental code generation and their implementation or use in the corresponding sub-system.

In the process, the corresponding variable may be defined in a data dictionary, for example. When the placeholders are used at the interfaces of the incremental code generation unit, TargetLink in the external code generation system automatically generates definitions on the basis of the links existing in the graphical model. In the internal system, the use of the corresponding placeholders is generated at the same time. In the external system, however, a definition of the placeholders used internally is generated.

In models having a plurality of hierarchical levels, a plurality of groups of placeholders may also be used; expediently, a placeholder of an internal sub-system is equated with the corresponding placeholder of an external sub-system. Preferably, corresponding definitions for the placeholders used are generated first in a model encompassing all the sub-systems.

According to another exemplary embodiment of the invention, during program code generation, in particular incremental program code generation, at least one local variable is applied using a definition of at least one placeholder in a ready-generated program code.

According to another exemplary embodiment of the invention, the variable represented by the first placeholder is accessed via a function call, and wherein the second placeholder, the third placeholder, and/or the fourth placeholder can be defined as empty. In this case, the variable represented by the first placeholder is advantageously stored in a database or a data dictionary that is not part of the graphical model.

According to another exemplary embodiment of the invention, the in particular external variable is read and written via a function call, in particular in an AUTOSAR RTE-API or runtime environment API, wherein the placeholders define a position at which they are generated in the program code. The corresponding variable can thus be generated precisely at a desired position in the code.

According to another exemplary embodiment of the invention, the placeholders are defined such that they provide a barrier in multithreading models, said barrier preventing different threads from simultaneously accessing the same resource. A user can thus implement a locking mechanism in a simple manner using a suitable macro definition.

According to another exemplary embodiment of the invention, the placeholders are defined such that error processing of an access function is provided, in particular by storing a last error-free value in a persistent variable.

Advantageously, the last known error-free value can thus be stored in a separate persistent variable (which can be defined in the corresponding setup macro) so that, if an error occurs, said placeholder can be used or an alternative access function can be called up.

The features described herein of the method for generating program code of an executable control program for controlling a control system may likewise be applied to the computer system according to the invention, and vice versa.

Figure 1:
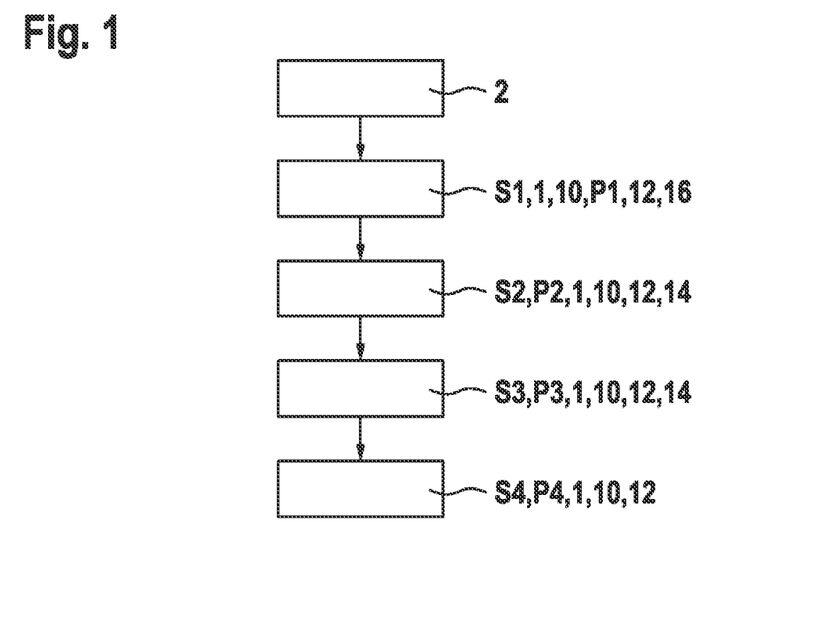
FIG. 1 is a flowchart of a method according to a preferred embodiment of the invention for generating program code of an executable control program for controlling a control system.

The method shown in FIG. 1 comprises generating program code 1 of an executable control program for controlling a control system.

In this case, the functionality of the control program is described at least in part in a graphical model 2. The graphical model 2 is translated into program code 1 in a text-based programming language.

The method further comprises generating S1 a first placeholder P1 representing a variable, said first placeholder being used in a predetermined segment 10 of the program code 1.

The method additionally comprises generating S2 a second placeholder P2, which is placed before a beginning of said predetermined segment 10 of the program code 1 that uses the first placeholder P1.

Furthermore, the method comprises generating S3 a third placeholder P3, which is placed after an end of said predetermined segment 10 of the program code 1 that uses the first placeholder P1.

The first placeholder P1, the second placeholder P2, and the third placeholder P3 are generated in a program code 1 that belongs to a sub-system 12 of the, in particular surrounding, graphical model 2.

The computer-implemented method further comprises generating S4 a fourth placeholder P4, which is placed at a beginning of a usage region 14 of said predetermined segment 10 of the program code 1 for defining the variable represented by the first placeholder P1.

In the predetermined portion 10 of the program code 1, a calculation is performed using the first placeholder P1, which represents a variable.

The second placeholder P2 is placed immediately before the beginning of said predetermined segment 10 of the program code 1 that uses the first placeholder P1, in particular at the beginning of the usage region 14 of the first placeholder P1.

The third placeholder P3 is placed immediately after the end of said predetermined segment 10 of the program code 1 that uses the first placeholder P1, in particular at the end of the usage region 14 of the first placeholder P1.

In the process, at least one placeholder, in particular the first placeholder P1, the second placeholder P2, the third placeholder P3, and/or the fourth placeholder P4, is generated as a preprocessor macro in the program code 1.

The placeholders are used in the sub-system 12 and defined in the graphical model 2.

During program code generation, in particular incremental program code generation, at least one local variable is applied using a definition of at least one placeholder P1, P2, P3, P4 in a ready-generated program code 1.

The variable represented by the first placeholder P1 is accessed via a function call 16. Furthermore, the second placeholder P2, the third placeholder P3, and/or the fourth placeholder P4 can, as required, be defined as empty.

In the context of conventional, variable-like placeholders, a fixed read-execute-write sequence is provided. This may cause problems where, for example, sub-systems or the program code comprised thereby run concurrently, like the runnable entities R1 and R2 shown in FIG. 2. The placeholder value is accessed, for example, by a function call in a runtime environment API at the start of the corresponding program code segment.

Conventionally, an RTE-API function cannot be retrospectively called up in a program code that has already been incrementally generated if said program code only has one (variable-like) placeholder. Consequently, the function can be generated only in the newly generated program code of the external system before the internal system is called up.

Figure 2:
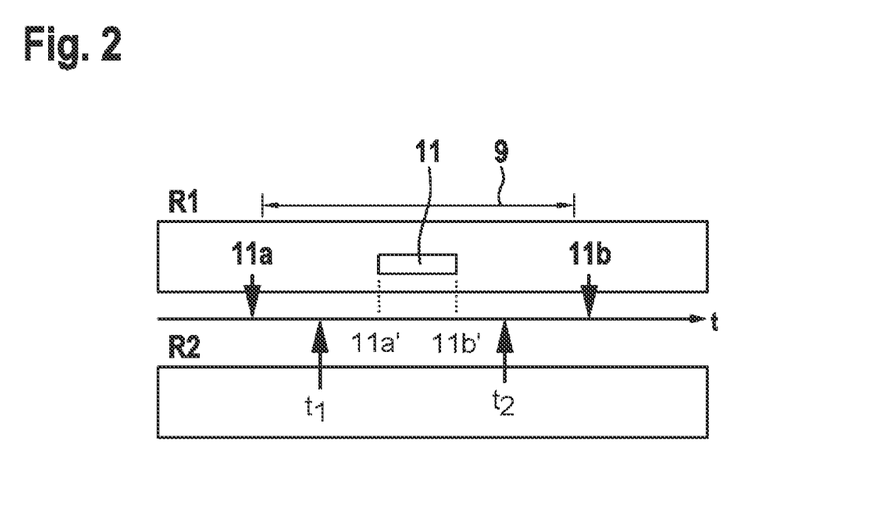
FIG. 2 is a flowchart of a method according to a preferred embodiment of the invention for generating program code of the executable control program for controlling the control system.

FIG. 2 shows the progression over time of the execution of two runnable entities R1 and R2 of an executable control program on a control unit.

By generating the code for the runnable entity R1 in accordance with the method according to the invention, better concurrence between reading and computation processes can be obtained.

The progression of the execution over time is plotted on the x axis; it can be seen that R1 and R2 are executed in parallel. In this case, 9 denotes an incrementally generated region of R1, and 11 denotes a portion in which the placeholder is accessed or used for the computation. According to the state of the art, the reading and writing accesses take place outside the incrementally generated region, in this case at the times 11*a* and 11*b*.

In this context, the in particular external variable is read and written in each case via a function call 16, in particular in an AUTOSAR RTE-API.

The figure also shows how a runnable entity R2 executed in parallel accesses the same variable at the time $t_1$ and writes a new value. Because runnable R1 performs the calculations using the variable once the writing access of R2 has taken place, said calculations ought to be performed again using the new value. However, since the reading access took place at the time 11*a*, the calculations will actually still be performed using an old value.

In addition, runnable entity R2 accesses the variable again at the time $t_2$ in order to read the current value. The value changed by the calculations in R1 ought to be applied now, but it is not written back until time 11*b*. Overall, the placement of the reading and writing accesses means that both R1 and R2 process an out-of-date, and potentially wrong, value for the variable.

Code generation according to the present invention generates the accesses in the code of the portion 11 such that they are closer to the calculations, as shown here by vertical dashed lines 11*a*' and 11*b*'. Using the present invention, therefore, it is possible—even with incremental code generation—for the value written at the time $t_1$ by R2 to be used in the calculation 11, and for the value calculated in 11 to be read by R2 already at the time $t_2$.

According to another preferred embodiment, TargetLink is used for modeling AUTOSAR software components or runnable entities included therein. A runnable entity is the smallest independently executable sub-module of an AUTOSAR software component. If the runnable entity has a multiplicity of sub-modules such as sub-systems, in particular library blocks, it may be difficult to assign an error that has occurred and to carry out the debugging.

Instead of direct or explicitly modeled AUTOSAR communication, it is expedient to use placeholders. An adapted model including a runnable entity adapted for the testing can then be generated for the individual sub-module.

By using placeholders, the code for the sub-module itself has to be generated only once. Multiple tests, as are generally needed when code is generated repeatedly, can thus be avoided.

In principle, similar test modeling can also be used for non-AUTOSAR models that use access functions similar to explicit AUTOSAR communication. One advantage of the placeholders is that they can be used for both explicit access functions and conventional/variable-like accesses.

According to another preferred embodiment, calibration and measured quantities are stored separately from a functional code. Therefore, it may be that, at the time the code for a component is generated, it is not yet precisely known from where said quantities are to be drawn. In addition, it may be that the component is intended to be re-used in a different project.

Using constants under AUTOSAR generally requires RTE-API function calls since calibration and measured quantities are meant to be stored in the RTE or runtime environment. In other cases, it may be necessary to call up a special hardware function. Since placeholders are modeled for accessing constants, the access details can be retrospectively adapted without any changes to the functional code.

Additionally, the corresponding sub-system, which provides, for example, a PID controller having calibratable functions, can be easily re-used without the need to generate any code again.

According to another preferred embodiment, the placeholders P1, P2, P3, P4 are defined such that they provide a barrier in multithreading models, said barrier preventing different threads from simultaneously accessing the same resource.

As soon as a model or a program comprises a plurality of threads, this requires a locking or barrier mechanism that prevents different threads from simultaneously accessing the same resource, in particular shared memory, i.e., a global variable, for example.

By way of example, a bit can be set to one or a predetermined counter variable can be increased at a corresponding placeholder position in the code. A particular task then continues as soon as it is possible to do so, and thus waits for a corresponding lock. To be released, the corresponding bit or the counter variable is then reset again.

Users can thus implement a locking mechanism in a simple manner using a suitable macro definition. In the process, the second placeholder P2 is used for locking, and the third placeholder P3 is used for releasing.

According to another preferred embodiment, the placeholders are furthermore defined such that error processing of an access function is provided, in particular by storing a last error-free value in a persistent variable.

If an error occurs, some access functions, e.g., RTE-API functions, can signal that the read data are incorrect, or that the data may have been incorrectly written. In this case, appropriate handling of these errors can be incorporated into the macro definitions. For instance, the last known error-free value can be stored in a separate persistent variable, which can be defined in the corresponding setup macro or placeholder so that, if an error occurs, said placeholder can be used or an alternative access function can be called up.

Figure 3:
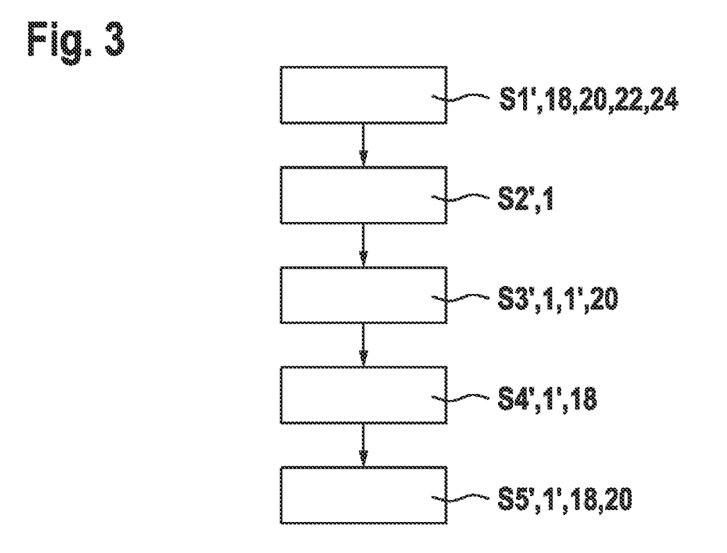
FIG. 3 shows a method for configuring a control unit according to a preferred embodiment of the invention.

FIG. 3 shows a method for configuring a control unit according to a preferred embodiment of the invention, the control unit 18 comprising at least one arithmetic logic unit 20 and preferably at least one sensor 22 and/or at least one actuator 24 in order to record data on a physical process and/or influence said process.

The method comprises inputting S1' a block diagram and generating S2' a program code 1 using the method according to the invention.

The method additionally comprises compiling S3' the program code 1 for the arithmetic logic unit 20 so that an executable program code 1' is generated, and transmitting S4' the executable program code 1' to the control unit 18.

The method further comprises storing S5' the executable code 1' on a non-volatile memory of the control unit 18 and/or executing the executable program code 1' by the arithmetic logic unit 20 of the control unit 18.

Figure 4:
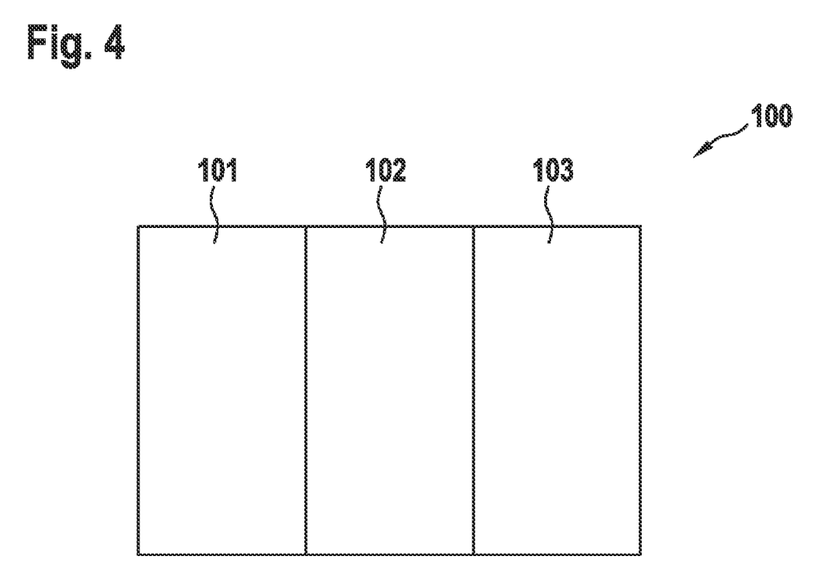
FIG. 4 is a schematic illustration of a computer system according to a preferred embodiment of the invention.

FIG. 4 is a schematic illustration of a computer system 100 according to a preferred embodiment of the invention.

The computer system 100 comprises a human-machine interface 101, a non-volatile memory 102, and a processor 103. The processor 103 is configured to carry out at least one of the methods according to the invention.

Figure 5:
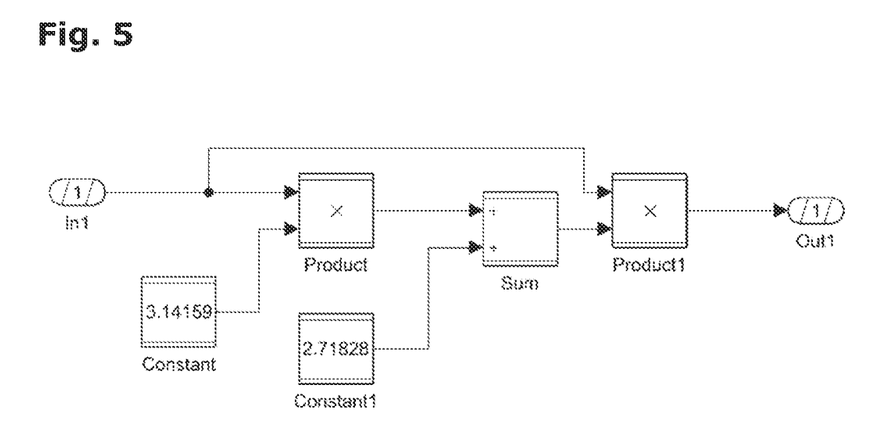
FIG. 5 is an exemplary block diagram from which program code can be generated.

FIG. 5 shows an example block diagram from which program code can be generated.

The block diagram shows an input port "In1," via which a scalar input signal is received, and an output port "Out1," via which a scalar output signal is issued. The input port "In1" is connected to a first calculation block "Product," which multiplies the received signal by a value 3.14159 received from the constant block "Constant." The first calculation block "Product" is connected to a second calculation block "Sum," which adds a value 2.71828, received from the constant block "Constant1," to the received signal. The second calculation block "Sum" is connected to a third calculation block "Product1," which multiplies the received signal by the input signal received at the input port "In1" and forwards the result to the output port.

According to a preferred embodiment of a method according to the invention, a first set of placeholders is generated for the input signal, and a second set of placeholders is generated for the output signal. A first placeholder "RDI_In," a second placeholder "RDI_In_Start," a third placeholder "RDI_In_Stop," and a fourth placeholder "RDI_In_Setup" are preferably generated for the input signal. A first placeholder "RDI_Out," a second placeholder "RDI_Out_Start," a third placeholder "RDI_Out_Stop," and a fourth placeholder "RDI_Out_Setup" are preferably generated for the output signal.

To be able to incorporate the block diagram as a library function "LibraryFunction," the following program code is expediently generated:

```
#include "tl_rdi_LibraryFunction.h"
void Sincr1_LibraryFunction(void)
{
    RDI_In_Setup
    RDI_Out_Setup
    RDI_In_Start
    RDI_Out_Start
    /* Outport: LibraryFunction/Out1
         # combined # Product: LibraryFunction/Product1
         # combined # Sum: LibraryFunction/Sum
         # combined # Product: LibraryFunction/Product */
    RDI_Out = RDI_In * ((RDI_In * 3.14159) + 2.71828);
    RDI_In_Stop
    RDI_Out_Stop
}
```

Depending on the intended use of the library function, the placeholders can be replaced by different program code fragments. If, for example, the input values are to be received via a variable and likewise issued via a variable, the second, third, and fourth placeholders can each be defined as empty. The resulting program code is just as compact as if no additional placeholders were provided.

If, in an alternative embodiment, the input values are to be received via a first access function "RDI_InImpl" and the output values are to be issued via a second access function "RDI_OutImpl," the placeholders can be defined as follows, in particular in the form of preprocessor macros:
define RDI_In RDI_InImpl
define RDI_In_Setup float64 RDI_InImpl;
define RDI_In_Start Rte_Read_ReceiverPort_DE(&RDI_InImpl);
define RDI_In_Stop
define RDI_Out RDI_OutImpl
define RDI_Out_Setup float64 RDI_OutImpl;
define RDI_Out_Start
define RDI_Out_Stop Rte_Write_SenderPort_DE(RDI_OutImpl);

Once the macros have been replaced, the ready-generated code then looks as follows for the compiler:

```
void Sincr1_LibraryFunction(void)
{
    float64 RDI_InImpl;
    float64 RDI_OutImpl;
    Rte_Read_ReceiverPort_DE(&RDI_InImpl);
    /* Outport: LibraryFunction/Out1
         # combined # Product: LibraryFunction/Product1
         # combined # Sum: LibraryFunction/Sum
         # combined # Product: LibraryFunction/Product */
    RDI_OutImpl = RDI_InImpl *
       ((RDI_InImpl * 3.14159) + 2.71828);
    Rte_Write_SenderPort_DE(RDI_OutImpl);
}
```

In the program code, the RTE-API functions are called up as desired within the library function using local variables. Owing to the adept placement of the additional macros, the code, which is generated once, is flexible enough to be used for communication via global variables and communication via access functions using local buffers, without any code having to be generated again for the incremental parts.

Consequently, a method according to the invention for generating program code makes it possible to adapt the generated program code in order to assist various communication modes, even in the case of incremental code generation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for generating program code of an executable control program for controlling a control system, wherein functionality of the control program is described at least in part in a graphical model, wherein the graphical model is translated into program code in a text-based programming language, the method comprising:
    separately generating incremental program code for a plurality of sub-systems of the control system, wherein the plurality of sub-systems of the control system include a first sub-system, wherein generating the incremental program code for the first sub-system comprises:
generating a first placeholder representing a variable, the first placeholder being used in a predetermined segment of program code;
generating a second placeholder, which is placed before a beginning of the predetermined segment of program code that uses the first placeholder; and
generating a third placeholder, which is placed after an end of the predetermined segment of program code that uses the first placeholder; and
after the incremental program code for the plurality of sub-systems is generated, merging the incremental program code for the plurality of sub-systems to form the program code for the graphical model;
wherein definitions for the first, second and third placeholders are generated after the incremental program code for the plurality of sub-systems of the control system is generated.

2. The computer-implemented method according to claim 1, further comprising:
generating a fourth placeholder, which is placed at a beginning of a usage region of the predetermined segment of program code for defining the variable represented by the first placeholder.

3. The computer-implemented method according to claim 1, wherein a calculation is performed in the predetermined segment of program code that uses the first placeholder.

4. The computer-implemented method according to claim 1, wherein the second placeholder is placed at the beginning of a usage region of the first placeholder.

5. The computer-implemented method according to claim 1, wherein the third placeholder is placed at the end of a usage region of the first placeholder.

6. The computer-implemented method according to claim 1, wherein the first placeholder, the second placeholder, and/or the third placeholder are generated as a preprocessor macro.

7. The computer-implemented method according to claim 1, wherein at least one local variable is applied using a definition of at least one placeholder in a ready-generated program code, wherein the at least one placeholder comprises the first placeholder, the second placeholder, the third placeholder, and/or a fourth placeholder.

8. The computer-implemented method according to claim 1, wherein the variable represented by the first placeholder is accessed via a function call, and wherein the second placeholder and/or the third placeholder are definable as empty.

9. The computer-implemented method according to claim 1, wherein an external variable is read and written via a function call, and wherein the second placeholder and the third placeholder each define a position at which a respective function call is generated.

10. The computer-implemented method according to claim 1, wherein the first, second and third placeholders are defined such that they provide a barrier in multithreading models, the barrier preventing different threads from simultaneously accessing a same resource.

11. The computer-implemented method according to claim 1, wherein the first, second and third placeholders are defined such that error processing of an access function is provided by storing a last error-free value in a persistent variable.

12. A method for configuring a control unit, wherein the control unit comprises at least one arithmetic logic unit, the method comprising:
inputting a block diagram;
generating program code using the method according to claim 1;
compiling the program code for the arithmetic logic unit so that an executable program code is generated;
transmitting the executable program code to the control unit; and
storing the executable program code on a non-volatile memory of the control unit and/or executing the executable program code by the arithmetic logic unit of the control unit.

13. A non-transitory computer-readable medium having processor-executable instructions stored thereon for generating program code of an executable control program for controlling a control system, wherein functionality of the control program is described at least in part in a graphical model, wherein the graphical model is translated into program code in a text-based programming language, and wherein the processor-executable instructions, when executed, facilitate:
separately generating incremental program code for a plurality of sub-systems of the control system, wherein the plurality of sub-systems of the control system include a first sub-system, wherein generating the incremental program code for the first sub-system comprises:
generating a first placeholder representing a variable, the first placeholder being used in a predetermined segment of program code;
generating a second placeholder, which is placed before a beginning of the predetermined segment of program code that uses the first placeholder; and
generating a third placeholder, which is placed after an end of the predetermined segment of program code that uses the first placeholder; and
after the incremental program code for the plurality of sub-systems is generated, merging the incremental program code for the plurality of sub-systems to form the program code for the graphical model;
wherein definitions for the first, second and third placeholders are generated after the incremental program code for the plurality of sub-systems of the control system is generated.

14. A computer system, comprising:
a human-machine interface;
a non-volatile memory having processor-executable instructions stored thereon; and
a processor configured to execute the processor-executable instructions to facilitate:
separately generating, by the computer system, incremental program code for a plurality of sub-systems of a control system, wherein the plurality of sub-systems of the control system include a first sub-system, wherein generating the incremental program code for the first sub-system comprises:
generating a first placeholder representing a variable, the first placeholder being used in a predetermined segment of program code;
generating a second placeholder, which is placed before a beginning of the predetermined segment of program code that uses the first placeholder; and
generating a third placeholder, which is placed after an end of the predetermined segment of program code that uses the first placeholder; and after the incremental program code for the plurality of sub-systems is generated, merging, by the computer system, the incremental program code for the plurality of sub-systems to form the program code for the graphical model;

wherein definitions for the first, second and third placeholders are generated after the incremental program code for the plurality of sub-systems of the control system is generated.

* * * * *